Patented June 14, 1927.

1,632,365

UNITED STATES PATENT OFFICE.

GEORGE WASHINGTON CARVER, OF TUSKEGEE, ALABAMA.

PROCESS OF PRODUCING PAINTS AND STAINS.

No Drawing. Original application filed June 13, 1923, Serial No. 645,199. Divided and this application filed January 29, 1925. Serial No. 5,638.

The invention relates to paints and stains, and has as an object the provision of a process for producing paints and stains from clays. Clays are found in many sections of the country of a variety of colors, and by a proper choice of color there may be produced by the process of the invention a large variety of colors of pigments, fillers and stains for treating wood or other materials.

To carry out the process of the invention the desired clay having a high percentage of iron is treated by any of the well known processes for refining the same and reducing it to a finely divided condition. A desirable composition for a clay to be treated by the process of the present invention is 5.6% peroxide of iron and 16.7% aluminum.

While a clay testing as above described and substantially free from lime or any similar alkali is suitable for the carrying out of a process without the addition of free iron, yet a higher iron content will vary the effect only by improving the result.

To reduce the clay to a gelatinous condition the same is treated with acid. For this purpose taking as a basis a quantity of 25 pounds of clay free from sand or other objectionable substances, 25 pounds of commercial sulphuric acid and 25 pounds commercial hydrochloric acid may be added to the clay, with three pounds of clean scrap iron of any kind, iron turnings being a desirable form for the iron. The clay and iron are put into an acid-proof vessel which is capable of withstanding heat, as for instance a porcelain vessel. The acids are added with enough water to make a thin paste. The substance is then boiled slowly, with frequent stirring, until the iron is dissolved. and the whole mass assumes a uniform color.

Water free from alkali is then added sufficient to substantially double the volume, when the solution is well stirred and allowed to settle for about five minutes, for the purpose of settlement of coarser portions. The material remaining in suspension with the liquid is then decanted into shallow acid-proof vessels and the remaining coarse and insoluble material is thrown away.

The material thus secured is utilized as a base for subsequent steps, the nature of which, as well as the nature of the clay first taken for treatment may be chosen to vary the color of the resultant products.

As a next step, when it is desired to produce a blue, 25 pounds potassium ferricyanide (or ferrocyanide) is dissolved in substantially four times its weight of cold water, or in twice its weight of hot water and poured into the clay mixture, which is then well stirred. If preferred, the potassium compound in powdered form may be stirred into the clay mixture, but superior results are found to result from the process when the ferricyanide is first dissolved as described.

Subsequent to the addition of the ferricyanide, 12½ pounds of concentrated nitric acid is added to the thus prepared mixture and allowed to stand until a rich blue color appears. This is stirred at intervals of about two weeks for substantially three months, for the purpose of oxidizing the material. At the end of this time the mass may be allowed to dry out until it is almost dry when it may be washed thoroughly to remove excess acid if a neutral pigment is desired. If an acid pigment is wanted the mass may be dried without washing.

The same result may be secured by a quick process, except that it is found that the resulting blue color is not so fine as that produced by the slow process above described. To quicken the process immediately after adding nitric acid live steam is turned into the mixture for bringing about the oxidation, and the mixture is constantly agitated with giving off of brown fumes. After the fumes cease to be given off, the material may be treated as above described at the end of the two months' period.

As a variation of the above process the nitric acid may be added with the sulphuric and hydrochloric, but it is found that slightly inferior results are thus obtained. Moreover, copperas may be substituted for the scrap iron with, however, probably not such fine results.

For use as a wood filler or stain, clay of a desired color may be treated with the acid as above described, with omission of the potassium ferricyanide, and the thus secured gelatinous clay is found to strike into the wood fiber and to produce an exceedingly smooth surface, giving a color thereto dependent upon the color of clay chosen for treatment, thereby acting as a filler and stain with the single application. It is found that a filler made as thus described becomes very hard when dry and enables the wood to take a high polish. Moreover, specimens of wood which have been thus treated are found, after twenty years, to be brighter and more beautiful than when first treated. For this use the iron scrap may be omitted if desired, especially when the potassium ferricyanide is not to be added to produce the blue filler and stain.

To produce a green stain and filler, the clay treated as above described, with potassium ferricyanide or potassium ferrocyanide, has added thereto a yellow ochre previously treated with acid as described in the beginning of the first portion of the process. To produce a mahogany brown, or red, the clay to be treated with the potassium ferricyanide has added thereto potassium sulphocyanide. When the resultant substance has been applied to wood and allowed to oxidize a rich brown color results. By mixing the blue clay product with red, yellow, brown, pink, purple, or white clay, a large variety of colors and shades may be produced which may be used as fillers and stains. Any of these materials can be used either in the acid condition or neutralized by washing.

The material thus described as a compound filler and stain, may be dried and mixed with linseed oil or its equivalent as a pigment to provide a paint. If desired to be darkened to a slight extent some good grade of carbon or lamp black may be added.

When the above acid treatment is carried out utilizing a micaceous clay of the variety of shades which occur in the southern States, a sheen results that has not to my knowledge been secured by heretofore used artificial mixtures.

This application is filed as a division of my former application for patent on Paints and stains and process of producing the same, Patent No. 1,541,478, granted June 9, 1925.

Minor changes may be made in the steps of the process and the proportion of the parts used without departing from the spirit of my invention.

I claim:

1. The process of producing pigment or the like which comprises treating ferruginous clay with acid, and adding a potassium-iron-cyanogen compound.

2. The process of producing pigment or the like which comprises treating a ferruginous clay with sulphuric and hydrochloric acids, and adding a potassium-iron-cyanogen compound.

3. The process of producing pigment or the like which comprises treating a mixture of clay and iron with sulphuric and hydrochloric acids, adding a solution of a potassium-iron-cyanogen compound, and treating the mixture with nitric acid.

4. The process of producing pigment or the like which comprises adding scrap iron to finely subdivided and refined clay, adding acid to the mixture and allowing action to continue until the iron is dissolved, adding a compound of potassium, iron and cyanogen and separating the coarser particles therefrom by decantation.

5. The process of producing pigment or the like which comprises treating a mixture of clay and free iron with acid, adding a solution of a potassium, iron, cyanogen compound, allowing the material to stand for an extended period of time with occasional stirring, and drying the product.

6. The process of producing pigment or the like which comprises treating a mixture of clay and free iron with acid, adding a solution of a potassium, iron, cyanogen compound, allowing the material to stand for an extended period of time with occasional stirring, washing the material free from acid, and drying the product.

7. The process of producing pigment or the like which comprises adding substantially three pounds of scrap iron to substantially twenty-five pounds of clay substantially free from sand or alkali, adding a mixture of twenty-five pounds of sulphuric and twenty-five pounds of hydrochloric acid with sufficient water to make a thin paste, boiling the mixture, adding to the thus prepared substance twenty-five pounds of a potassium, iron, cyanogen compound dissolved in water, adding to the mixture twelve and one-half pounds of nitric acid and stirring the mixture until the fumes cease.

8. Boiling clay of desired color with acid and adding the same to the material prepared by the process of claim 2 to produce a color dependent upon the color of the prepared and added clay.

GEORGE WASHINGTON CARVER.